(12) United States Patent
Jung et al.

(10) Patent No.: US 10,142,671 B2
(45) Date of Patent: Nov. 27, 2018

(54) USER INTERFACE APPARATUS FOR VEHICLES AND VEHICLE HAVING THE SAME

(71) Applicant: LG ELECTRONICS INC., Seoul (KR)

(72) Inventors: Mingoan Jung, Seoul (KR); Hyungoo Kang, Seoul (KR); Jihyun Kim, Seoul (KR); Wonsok Yoon, Seoul (KR); Ohjin Kweon, Seoul (KR); Kyoungil Lee, Seoul (KR); Seunggyu Lee, Seoul (KR); Jonghoon Kim, Seoul (KR); Yeonji Lee, Seoul (KR); Heonsuk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/435,625

(22) Filed: Feb. 17, 2017

(65) Prior Publication Data

US 2017/0311029 A1    Oct. 26, 2017

Related U.S. Application Data

(60) Provisional application No. 62/297,234, filed on Feb. 19, 2016, provisional application No. 62/300,273, filed on Feb. 26, 2016.

(30) Foreign Application Priority Data

Apr. 29, 2016    (KR) .................. 10-2016-0053427

(51) Int. Cl.
*H04N 21/414*    (2011.01)
*H04M 1/60*      (2006.01)
(Continued)

(52) U.S. Cl.
CPC ... *H04N 21/41422* (2013.01); *G06F 3/03547* (2013.01); *H04M 1/6091* (2013.01);
(Continued)

(58) Field of Classification Search
None
See application file for complete search history.

(56) References Cited

U.S. PATENT DOCUMENTS 6,091,497 A  *  7/2000  Paritsky ............... G01D 5/26
                                                356/623
6,469,755 B1 * 10/2002  Adachi ............. G02B 6/0018
                                                349/62
(Continued)

FOREIGN PATENT DOCUMENTS

EP         2208645        7/2010
KR     2009059047 B1      6/2009
(Continued)

OTHER PUBLICATIONS

Extended European Search Report in European Application No. 17156736.5, dated Aug. 21, 2017, 8 pages (with English translation).

*Primary Examiner* — Chico A Foxx
(74) *Attorney, Agent, or Firm* — Fish & Richardson P.C.

(57) ABSTRACT

Disclosed herein is a user interface apparatus for vehicles including light sources, a touch sensor to sense touch, light guides to transfer light generated by the light sources, and a top cover to cover the light sources, the touch sensor and the light guides and to transmit light emitted from the light guides to the interior of a vehicle. The light sources includes a first light source and at least one second light sources, the light guides includes first and second light guides to receive light generated by the first light source and to transfer the light to first and second regions and at least one third light guide configured to receive light generated by the at least
(Continued)

one second light source and to transfer the light to a third region, and light generated by the first light source is dispersed and provided to the first and second light guides.

21 Claims, 16 Drawing Sheets

(51) Int. Cl.
    *H04N 21/40*           (2011.01)
    *G06F 3/0354*        (2013.01)
    *B60R 1/12*            (2006.01)

(52) U.S. Cl.
    CPC .......... *H04N 21/40* (2013.01); *H04N 21/414* (2013.01); *B60R 2001/1284* (2013.01); *G06F 2203/0339* (2013.01)

(56) References Cited

U.S. PATENT DOCUMENTS

| | | | | |
|---|---|---|---|---|
| 7,413,334 B2* | 8/2008 | Baba | .................... | G02B 6/0021 362/600 |
| 8,789,989 B2* | 7/2014 | Demma | ............... | G02B 6/0041 362/487 |
| 8,882,317 B2* | 11/2014 | Demma | ............... | H03K 17/962 362/487 |
| 2003/0210537 A1* | 11/2003 | Engelmann | .......... | G02B 6/0018 362/23.15 |
| 2006/0262564 A1* | 11/2006 | Baba | .................... | G02B 6/0021 362/616 |
| 2009/0091949 A1* | 4/2009 | Lee | ...................... | G02B 6/0036 362/620 |
| 2009/0174533 A1* | 7/2009 | Bowden | ................. | B60K 37/02 340/425.5 |
| 2010/0137027 A1* | 6/2010 | Kim | ..................... | G06F 3/03547 455/556.1 |
| 2010/0302799 A1* | 12/2010 | Rosberg | ............... | G02B 6/0041 362/602 |
| 2012/0146926 A1* | 6/2012 | An | ...................... | G06F 3/03547 345/173 |
| 2012/0257416 A1* | 10/2012 | Demma | ............... | G02B 6/0041 362/613 |
| 2012/0314445 A1* | 12/2012 | Masuda | ............... | G02B 6/0008 362/581 |
| 2013/0054758 A1* | 2/2013 | Imes | ................... | H04L 12/2827 709/219 |
| 2013/0176706 A1* | 7/2013 | Deom | .................... | G02B 6/006 362/23.07 |
| 2014/0075311 A1* | 3/2014 | Boettcher | ............... | G06F 3/165 715/716 |
| 2014/0125602 A1* | 5/2014 | Chen | ....................... | G06F 3/041 345/173 |
| 2016/0062626 A1* | 3/2016 | Kubota | ................. | G06F 3/0488 715/716 |

FOREIGN PATENT DOCUMENTS

| | | |
|---|---|---|
| KR | 2009072874 B1 | 7/2009 |
| KR | 2009074571 B1 | 7/2009 |
| KR | 2009132252 B1 | 12/2009 |
| KR | 2011103595 B1 | 9/2011 |
| KR | 2014040974 B1 | 4/2014 |
| KR | 1575648 B1 | 12/2015 |

* cited by examiner

USER INTERFACE APPARATUS FOR VEHICLES AND VEHICLE HAVING THE SAME

CROSS-REFERENCE TO RELATED APPLICATION

This application claims the priority benefit of U.S. Provisional application No. 62/297,234 filed on Feb. 19, 2016, in the USPTO, U.S. Provisional application No. 62/300,273 filed on Feb. 26, 2016, in the USPTO, and Korean Patent Application No. 10-2016-0053427, filed Apr. 29, 2016, in the Korean Intellectual Property Office, the disclosures of which are incorporated herein by reference.

BACKGROUND OF THE INVENTION

1. Field of the Invention

The present invention relates to a user interface apparatus for vehicles provided in a vehicle and a vehicle having the same.

2. Description of the Related Art

In general, vehicles are apparatuses which move in a direction desired by a user. As a representative example, there is an automobile.

For the purpose of vehicle user convenience, vehicles tend to be provided with various sensors and electronic devices. Particularly, research on an Advanced Driver Assistance system (ADAS) has been vigorously carried out for user driving convenience. Further, development of autonomous vehicles has been vigorously carried out.

A physical or electronic input unit to receive a user command to control a vehicle is generally provided in the vehicle.

However, the conventional input unit to receive a user command is manufactured separately from the interior of a vehicle and then installed in the vehicle and, thus, there is no sense of unity therebetween.

Further, even if the conventional input unit is touched through user's carelessness or pressure is applied to the conventional input unit, the conventional unit outputs a control signal.

Moreover, if a user command is input to the conventional input unit, a separate display unit to confirm input of the user command is required.

SUMMARY OF THE INVENTION

An object of the present invention is to provide a user interface apparatus for vehicles which provides a sense of unity with the interior of a vehicle when not in use, and allows a user to recognize a position to input a user command when in use.

Another object of the present invention is to provide a vehicle having a user interface apparatus for vehicles.

The objects of the present invention are not limited to the above-mentioned objects and other objects that have not been mentioned above will become evident to those skilled in the art from the following description.

To achieve the above objects, there is provided a user interface apparatus for vehicles according to an exemplary embodiment of the present invention, including light sources, a touch sensor configured to sense touch, light guides configured to transfer light generated by the light sources, and a top cover configured to cover the light sources, the touch sensor and the light guides and to transmit light emitted from the light guides to the interior of a vehicle so as to project an image, wherein the light sources includes a first light source and at least one second light sources, the light guides includes a first light guide configured to receive light generated by the first light source and to transfer the light to a first region of the top cover, a second light guide configured to receive light generated by the first light source and to transfer the light to a second region of the top cover, and at least one third light guide configured to receive light generated by the at least one second light source and to transfer the light to a third region of the top cover, and light generated by the first light source is dispersed and provided to the first light guide and the second light guide.

The top cover may include a light transmission part corresponding to the first to third regions and having a designated light transmittance and an interception part to block light, and the thickness of the light transmission part may be less than the thickness of the interception part.

The user interface apparatus for vehicles may further include color filters configured to change wavelengths of light supplied from the light guides and then to provide the light having changed wavelengths to the first to third regions of the top cover.

The user interface apparatus for vehicles may further include a light interception filter configured to transmit light from the light guides and then to provide the light to the first to third regions of the top cover, and to restrict transmission of light from the light guides to other regions of the top cover except for the first to third regions.

The touch sensor may be disposed such that at least a part of the touch sensor may vertically overlap the second light guide.

The first to third light guides may be separated from one another.

The first to third light guides may be formed integrally, and the light guides may further include partitions to define the boundaries between the first to third light guides and to block light.

The user interface apparatus for vehicles may further include a light path conversion unit configured to disperse light incident from the first light source so as to provide the light to the first light guide and the second light guide.

The light path conversion unit may include a reflector including a first reflective surface configured to receive light provided from the first light source and to reflect the light toward the first light guide, and a second reflective surface disposed at a designated angle from the first reflective surface and configured to receive light incident from the first light source and to reflect the light toward the second light guide.

The length of the second light guide may be greater than the length of the first light guide.

The quantity of light incident upon the second reflective surface from the first light source may be greater than the quantity of light incident upon the first reflective surface from the first light source.

The user interface apparatus for vehicles may further include a first subsidiary light source configured to provide light to the second light guide.

The first light source may be disposed adjacent to one end of the second light guide in the length direction, and the first subsidiary light source may be disposed adjacent to the other end of the second light guide in the length direction.

The second light guide may include reflective protrusions to reflect light provided from the first light source, and pitches between the reflective protrusions may be decreased as the distance between the reflective protrusions and the first light source increases.

The second light guide may include an incidence surface configured to receive light incident from the first light source, an emission surface disposed so as to intersect the incidence surface, having a greater area than that of the incidence surface, and configured to emit light incident through the incidence surface, and a transfer surface disposed opposite the emission surface and configured to reflect light incident through the incidence surface so as to transfer the light, and the transfer surface may approach the emission surface as the distance between the transfer surface and the first light source increases.

A plurality of second light sources may be disposed, third light guides may be provided in a number corresponding to the number of the second light sources, and the user interface apparatus for vehicles may further include interception ribs disposed between the third light guides so as to intercept light.

The user interface apparatus for vehicles may further include a circuit board having light transmittance and configured to provide a space to locate the light sources and the touch sensor therein, and the interception ribs may protrude from the circuit board.

The user interface apparatus for vehicles may further include a circuit board having light transmittance and configured to provide a space to locate the light sources and the touch sensor therein.

The user interface apparatus for vehicles may further include a processor configured to control the light sources according to touch input sensed by the touch sensor.

If the touch sensor senses first touch, the processor may control the first light source so as to generate light corresponding to the first touch.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1:
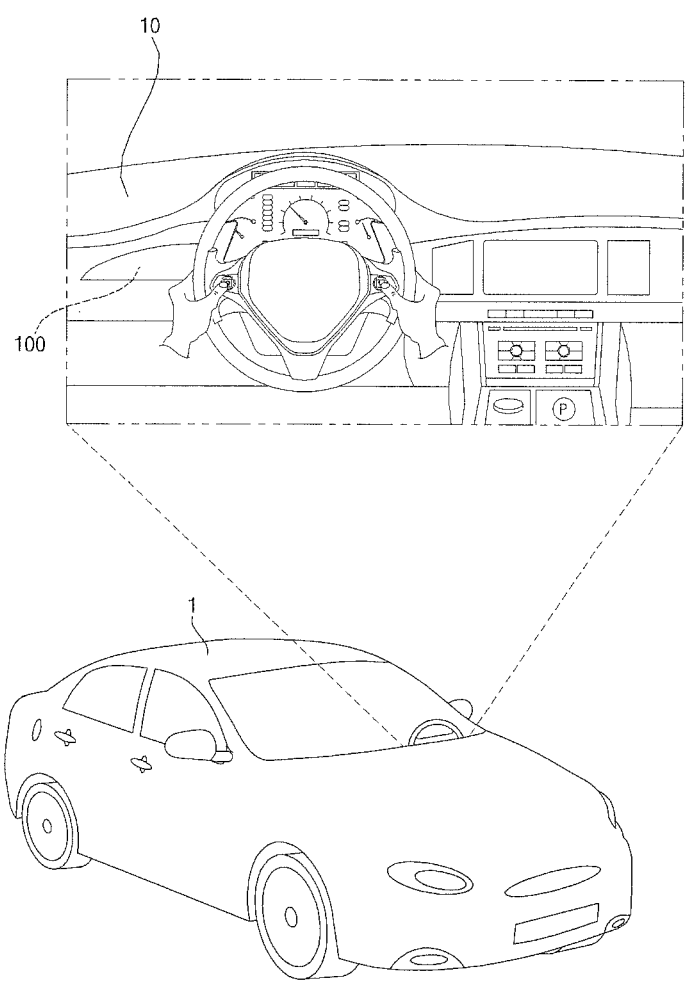
FIG. 1 is a view illustrating the external appearance of a vehicle in accordance with one embodiment of the present invention.

The advantages and features of the present invention, and the way of attaining the same, will become apparent with reference to embodiments described below in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts. The suffixes "module" and "unit" used in the description below are given or used together only in consideration of ease in preparation of the specification and do not have distinctive meanings or functions. In the following description of the present invention, a detailed description of known functions and configurations incorporated herein will be omitted when it may make the subject matter of the present invention rather unclear. Further, the accompanying drawings have been made only for a better understanding of the embodiments disclosed in the specification and do not limit the technical scope of the invention, and those skilled in the art will appreciate that various modifications, additions, and substitutions to the specific elements are possible, without departing from the scope and spirit of the invention as disclosed in the accompanying claims.

In the following description of the embodiments, relational terms including ordinal numbers, such as "first", "second", etc., may be used to describe various elements, but these elements are not limited by the terms. These terms may be used only to distinguish one substance or element from other substances or elements.

In the following description of the embodiments, it will be understood that when an element is referred to as being "connected" to another element, it can be directly connected to the element, and one or more intervening elements may also be present therebetween. On the other hand, it will be understood that when an element is referred to as being "directly connected", there may be no intervening elements present therebetween.

It will be understood that a singular expression includes a plural expression unless stated otherwise.

In the following description of the embodiments, a term "including" or "having" will be interpreted as indicating the presence of a feature, a number, a step, an operation, an element, a part, stated in the specification, or combinations thereof and does not exclude presence or addition of one or more features, numbers, steps, operations, parts or combinations thereof.

Spatially relative terms such as "below", "beneath", "lower", "above", "upper", etc. may be used only to easily describe relations between one element or component and other elements or components. It will be understood that spatially relative terms may include different directions of elements during use or operation, in addition to a direction shown in the accompanying drawings. For example, if a component shown in a figure is reversed, the component stated to be located "below" or "beneath" another component may be located "above" the latter. Therefore, the exemplary term "below" may include the upward and downward directions. Components may be oriented in different directions and thereby the spatially relative terms may be interpreted according to orientations.

Further, during a process of describing the structures of the embodiments, angles and directions stated in the drawings are used as criteria. In the specification, if the reference point of an angle and position relations are not clearly stated in description of a structure forming a light emitting device, related drawings will be referred to.

Vehicles stated in the specification may include an automobile, a motorcycle, etc. Hereinafter, an automobile may be described as the vehicle.

Vehicles in the specification may include an internal combustion vehicle provided with an engine as a power source, a hybrid electric vehicle provided with an engine and an electric motor as power sources, an electric vehicle provided with an electric motor as a power source, etc.

FIG. 1 is a view illustrating the external appearance of a vehicle in accordance with one embodiment of the present invention.

With reference to FIG. 1, a vehicle 1 may include wheels rotated by a power source, and a steering input device to adjust the driving direction of the vehicle 1.

According to embodiments, the vehicle 1 may be an autonomous vehicle 1. The autonomous vehicle 1 may switch to an autonomous driving mode or a manual mode according to user input. If the autonomous vehicle 1 switches to the manual mode, the autonomous vehicle 1 may receive steering input through the steering input device.

The vehicle 1 may include an engine to supply power based on fossil fuels, or an electric motor to supply power using a DC power source, such as a solar cell or a battery. Further, the vehicle 1 may include a transmission to convert power from the engine into rotary force, a brake 1 to stop the vehicle 1, etc.

The vehicle 1 may include a driver assistance system. The driver assistance system assists a driver based on information acquired from various sensors. Such a driver assistance system may be called an Advanced Driver Assistance System (ADAS).

The vehicle 1 may include a user interface apparatus 100 serving as an output device and an input device, provided at the interior of the vehicle 1. The user interface apparatus 100 receives a user command and outputs visual information corresponding to the user command.

The user interface apparatus 100 is located at any one of various positions of the interior of the vehicle 1. For example, the user interface apparatus 100 may be installed at a dashboard 10 or on the inner surface of a door.

Figure 2A:
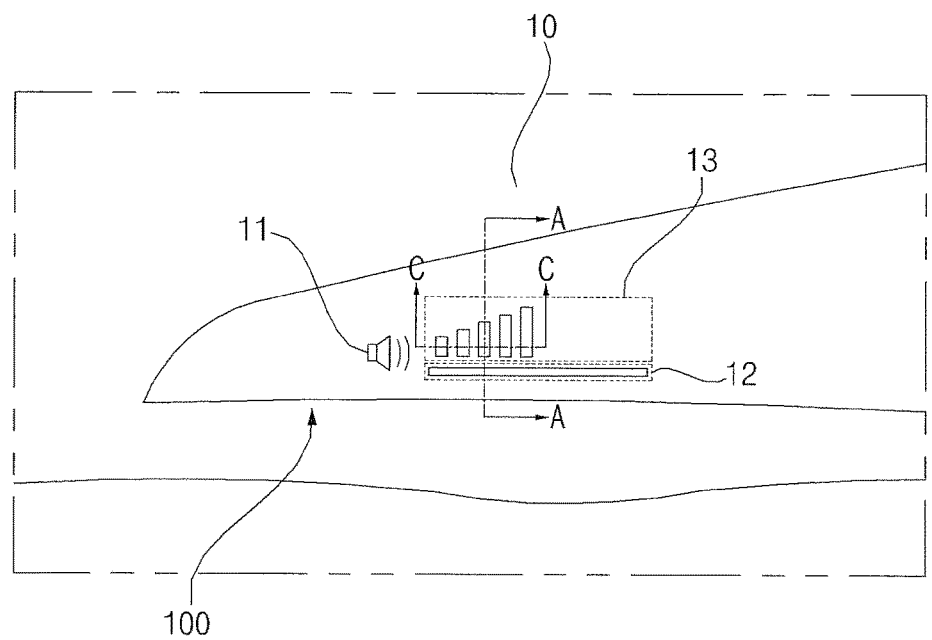
FIGS. 2A and 2B are views illustrating the external appearance of a user interface apparatus in accordance with one embodiment of the present invention.
Figure 2B:
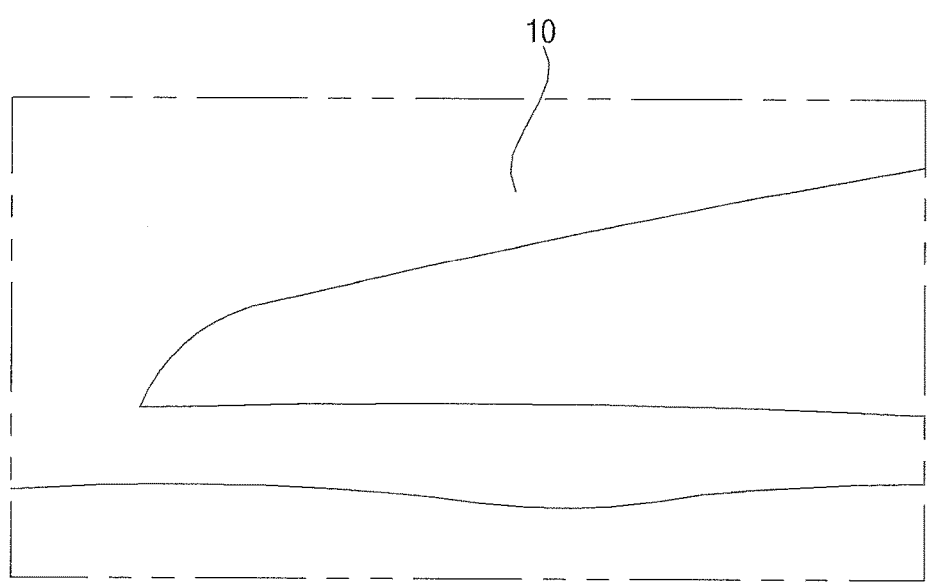

FIGS. 2A and 2B are views illustrating the external appearance of a user interface apparatus 100 in accordance with one embodiment of the present invention.

FIG. 2A is a view illustrating the user interface apparatus 100 in a state in which a user command is input to the user interface apparatus 100 and thus a light source is activated, and FIG. 2A is a view illustrating the user interface apparatus 100 in a state in which no user command is input to the user interface apparatus 100 and thus the light source is deactivated.

With reference to FIG. 2B, a top cover 110 forming the external appearance of the user interface apparatus 100 is formed of the same material as the outer surface of a position at which the user interface apparatus 100 is installed. For example, the user interface apparatus 100 may be installed at the dashboard 10, a door or a steering device. If the user interface apparatus 100 is installed at the dashboard 10, the top cover 110 of the user interface apparatus 100 is formed of the same material as the material of the dashboard 10 and forms one region of the dashboard 10. If the user interface apparatus 100 is in a deactivated state, an input unit and an output unit are not exposed to the outside. Therefore, as the user interface apparatus 100 in the deactivated state is not exposed to the outside, the user interface apparatus 100 may be more aesthetically pleasing to a user.

With reference to FIG. 2A, when the user interface apparatus 100 is activated, the cover (one region of the dashboard 10) transmits an image or light, and thus outputs an image. The user interface apparatus 100 outputs one image or a plurality of images. In more detail, the user interface apparatus 100 includes first to third regions 11, 12 and 13 to project a plurality of images. The first to third regions 11, 12 and 13 may be operated by different control signals or display characters having different meanings.

Figure 3:
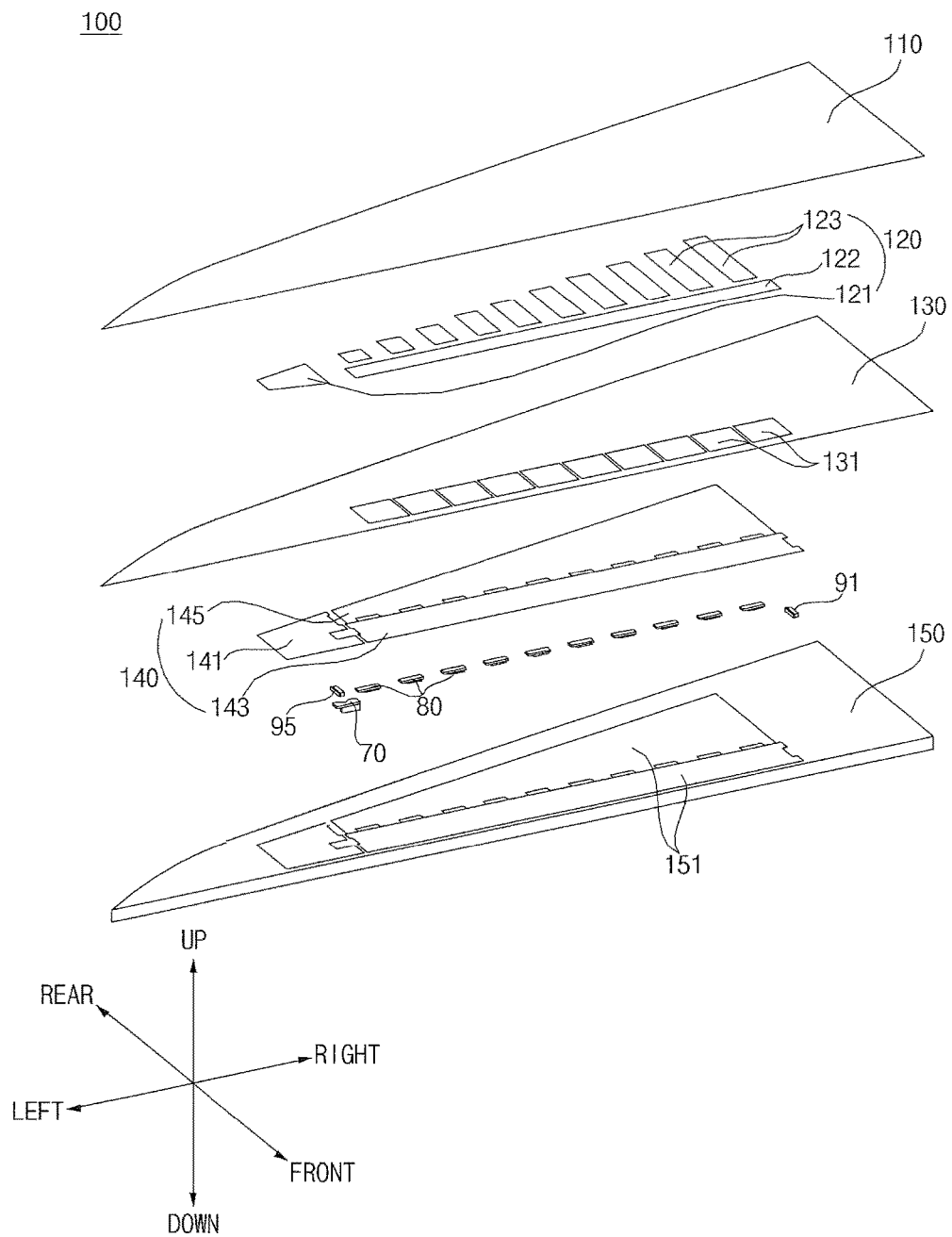
FIG. 3 is an exploded perspective view of the user interface apparatus shown in FIGS. 2A and 2B.
Figure 4:
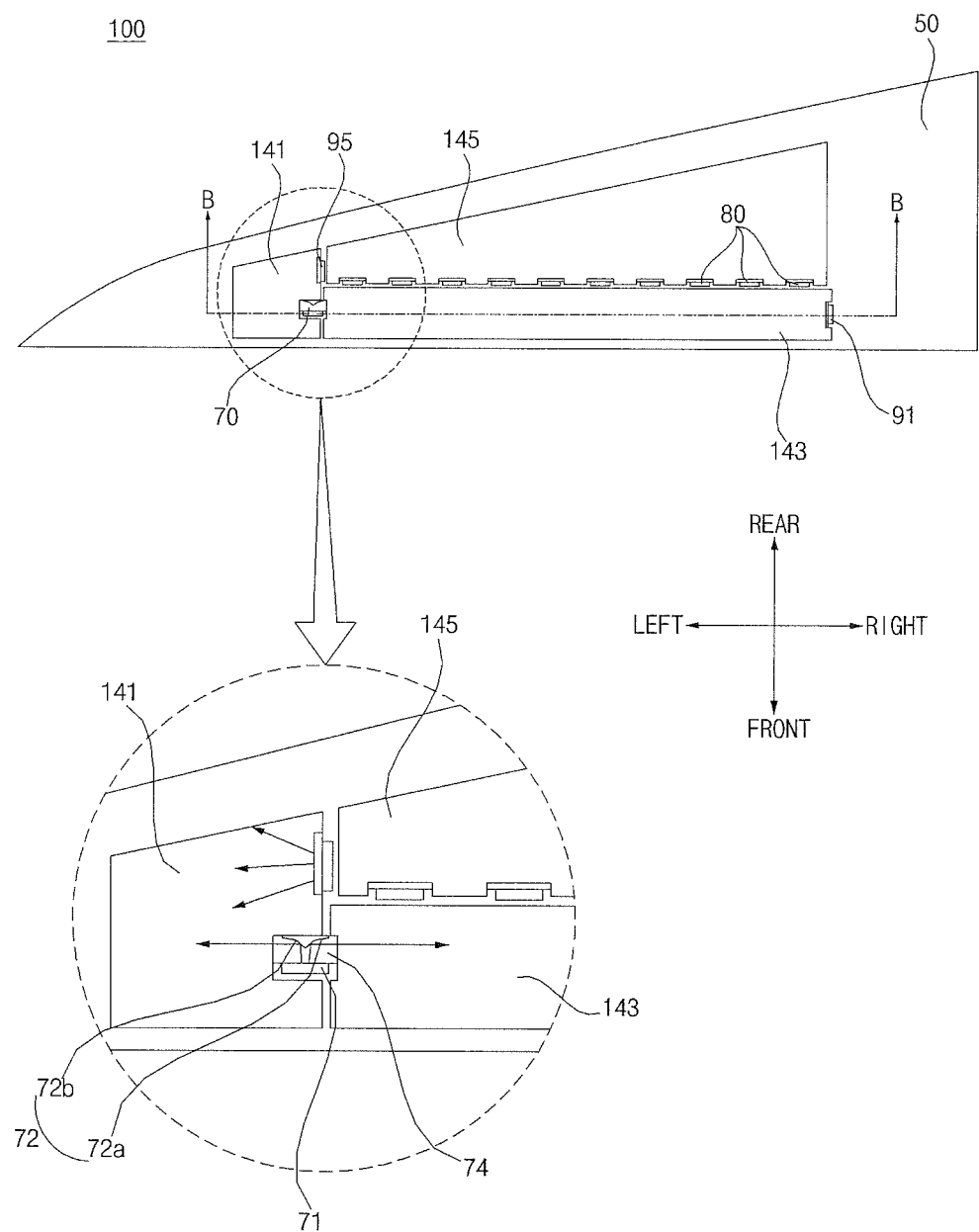
FIG. 4 is a view illustrating the user interface apparatus shown in FIG. 2A, from which some elements are removed.
Figure 5:
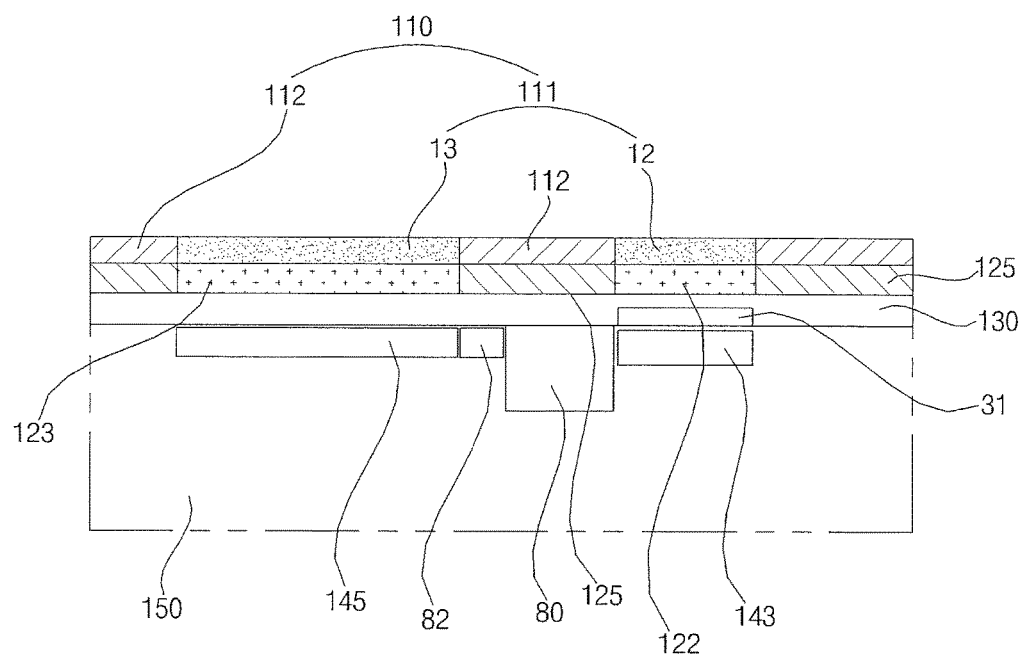
FIG. 5 is a cross-sectional view taken along line A-A of FIG. 2A.

FIG. 3 is an exploded perspective view of the user interface apparatus shown in FIGS. 2A and 2B, FIG. 4 is a view illustrating the user interface apparatus shown in FIG. 2A, from which some elements are removed, and FIG. 5 is a cross-sectional view taken along line A-A of FIG. 2A.

With reference to FIGS. 3 to 5, the user interface apparatus 100 in accordance with this embodiment includes light sources, a touch sensor 31 to sense touch, light guides 140 to transfer light generated by the light sources, and the top cover 110 to cover the light sources, the touch sensor 31 and the light guides 140 and to transmit light emitted from the light guides 140 to the interior of the vehicle 1 so as to project an image.

The light guides 140 serve to diffuse light incident from the light sources and then to transfer the light. That is, the light guides 140 may uniformize brightness of incident light, convert incident point light into surface light, and emit the surface light to the outside through an emission surface 143a. In more detail, in order to manufacture the user interface apparatus 100 of a slim design, the light guides 140 may receive incident light in the sideward direction and then emit light in the upward direction. Here, the sideward direction includes the forward and backward directions and the leftward and rightward directions.

For example, the light guides 140 may be hollow metal tubes formed of a transparent material so that light may propagate along the inside of the light guides 140. In more detail, the light guides 140 may be manufactured as a flat type or a wedge type formed of polymethylmethacrylate or a transparent acrylic resin, be formed of glass or include a lens formed of a plastic lens, but the disclosure is not limited thereto.

At least one optical sheet (not shown) to condense and diffuse surface light incident from the light guides 140 may be provided on the upper surface of the light guides 140, and at least one reflective sheet (not shown) may be provided on the lower surface of the light guides 140.

The reflective sheet may be disposed under the light guides 140, but the disclosure is not limited thereto. The reflective sheet reflects light generated by the light sources in the upward direction of the light guides 140 and may thus increase light transmission efficiency. According to embodiments, the reflective sheet may be omitted and a reflective material may be applied to a region of a bottom cover which will be described later, where the light guides 140 are located.

The optical sheet serves to condense and diffuse surface light incident from the light guides 140. For example, the optical sheet includes diffusion particles, such as beads, and thus diffuses light incident from the light guides 140 in the upward direction of the light guides 140. Of course, the optical sheet and the reflective sheet may be formed integrally with the light guides 140, thus forming a module.

The light guides 140 are disposed so as to transfer light to the first region 11 to the third region 13 of the top cover 110. The light guides 140 are disposed below the top cover 110. For example, the light guides 140 may include a first light guide 141, a second light guide 143 and third light guides 145.

The first light guide 141 receives light generated by a light source and transfers the light to the first region 11 of the top cover 110. In more detail, the first light guide 141 has a shape and size which may cover the first region 11 of the top cover 110. The first light guide 141 may be disposed such that a part of the first light guide 141 may vertically overlap the first region 11 of the top cover 110.

The second light guide 143 receives light generated by a light source and transfers the light to the second region 12 of the top cover 110. In more detail, the second light guide 143 has a shape and size which may cover the second region 12 of the top cover 110. The second light guide 143 may be disposed such that a part of the second light guide 143 may vertically overlap the second region 12 of the top cover 110.

The third light guides 145 receive light generated by light sources and transfer the light to the third region 13 of the top cover 110. In more detail, the third light guides 145 have a shape and size which may cover the third region 13 of the top cover 110. The third light guides 145 may be disposed such that a part of the third light guide 145 may vertically overlap the third region 13 of the top cover 110.

The first light guide 141 to the third light guides 145 may be formed integrally or formed separately. If the first to third light guides 141, 143 and 145 are formed integrally, partitions (not shown) to define the boundaries between the first to third light guides 141, 143 and 145 may be formed. The partitions in the light guides 140 are formed of an opaque material which does not transmit light.

If the first to third light guides 141, 143 and 145 are formed separately, the partitions to define the boundaries between the first to third light guides 141, 143 and 145 may form some regions of the bottom cover 150, which will be described later. That is, some regions of the bottom cover 150 may protrude and thus form the partitions.

Although the first to third light guides 141, 143 and 145 may respectively receive light from separate light sources, in order to reduce the number of parts and to decrease the volume of the user interface apparatus 100 of this embodiment, the first light guide 141 and the second light guide 143 may share a light source and the third light guides 145 may use separate light sources. This will be described later.

The first to third light guides 141, 143 and 145 may have different areas. Here, the areas of the first to third light guides 141, 143 and 145 mean areas viewed from the top. In detail, the first light guide 141 transfers light so as to cause a user to recognize the functions of the user interface apparatus 100. The second light guide 143 is disposed at one side of the first light guide 141. The length of the second light guide 143 is greater than the length of the first light guide 141. In more detail, the second light guide 143 may be extended in the leftward and rightward directions.

The second light guide 143 causes the user to recognize the position of the touch sensor 31. Therefore, the second light guide 143 is disposed such that at least a part or the entirety of the second light guide 143 may vertically overlap the touch sensor 31.

The third light guides 145 are disposed at one side of the second light guide 143. A plurality of third light guides 145 is provided and transfer light so as to cause the user to recognize the states (levels, etc.) of the functions of the user interface apparatus 100. In detail, a plurality of third light guides 145 is provided. In more detail, a plurality of third light guides 145 is extended in a direction intersecting with the second light guide 143. The third light guides 145 may be arranged at a designated pitch in the length direction of the second light guide 143. The third light guides 145 may have different lengths. The lengths of the third light guides 145 are increased in the length direction of the second light guide 143.

Of course, one third light guide 145 may be divided into a plurality of regions by a material intercepting light in the light guides 140.

The light sources generate light and provide light to the light guides 140. Light generated by the light sources is transferred through the light guides 140 and is then emitted to the outside through the cover. For example, the light sources may include all units to generate light. For example, the light sources may include semiconductor diodes, such as light emitting diodes, laser diodes, etc.

In detail, the light sources may be implemented as a chip on board type in which light emitting diodes are mounted on a circuit board 130, which will be described later. However, the disclosure is not limited thereto.

Further, the light sources may include color light emitting diodes to emit light of red, green, blue, white, etc., or ultraviolet (UV) light emitting diodes to emit ultraviolet light, but the disclosure is not limited thereto.

Here, one light source or a plurality of light sources may be disposed. For example, a number of light sources corresponding to a number of the light guides 141, 143 and 145 of the light guides 140 may be provided, or one light source may provide light to the light guides 141, 143 and 145 of the light guides 140.

For example, the light sources may include a first light source 70 to provide light to the first light guide 141 and the second light guide 143, and at least one second light source 80 to provide light to the third light guides 145.

The first light source 70 disperses light and thus provides light to the first light guide 141 and the second light guide 143. In order to reduce the number of light sources and to increase space utilization, the first light guide 141 and the second light guide 143 share one first light source 70. That is, light generated by the first light source 70 is dispersed and provided to the first light guide 141 and the second light guide 143.

In detail, the first light source 70 may be disposed adjacent to the first light guide 141 and the second light guide 143, and have various structures which may disperse light and thus provide light to the first light guide 141 and the second light guide 143. The first light source 70 is disposed adjacent to one end of the second light guide 143 in the length direction.

The first light source 70 generates light, if the touch sensor 31 senses first touch.

As exemplarily shown in FIG. 4, the first light source 70 includes a light path conversion unit to disperse light provided by the first light source 70 and thus to provide the light to the first light guide 141 and the second light guide 143. Here, the first light source 70 may be implemented as a light emitting device 71 to emit light.

The light path conversion unit may have various structures which disperse the path of light incident from the first light source 70 to provide the light to the first light guide 141 and the second light guide 143. The light path conversion unit may include a light pipe or a reflector 72. In this embodiment, the light path conversion unit is implemented as the reflector 72.

The reflector 72 has a first reflective surface 72a which receives light incident from the first light source 70 and reflects the light toward the first light guide 141, and a second reflective surface 72b which receives light incident from the first light source 70 and reflects the light toward the second light guide 142. A vortex convex in the downward direction may be formed at a connection point between the first reflective surface 72a and the second reflective surface 72b of the reflector 72.

Specifically, the first reflective surface 72a and the second reflective surface 72b may have different areas in consideration of the sizes of the first light guide 141 and the second light guide 143. For example, if the light demands of the first light guide 141 and the light demands of the second light guide 143 are equal, the first reflective surface 72a and the second reflective surface 72b have the same area and the boundary between the first reflective surface 72a and the second reflective surface 72b overlaps the center of a light emitting device 71.

As another example, if the length of the second light guide 143 is greater than the length of the first light guide 141, the quantity of light incident upon the second reflective surface 72b from the first light source 70 may be greater than the quantity of light incident upon the first reflective surface 72a from the first light source 70. That is, the second reflective surface 72b may have a greater area than the area of the first reflective surface 72a and the boundary between the first reflective surface 72a and the second reflective surface 72b may be located at a position leaning to the second light guide 143 from the center of the light emitting device 71.

In consideration of a degree of condensation of light and a degree of diffusion of light, the first reflective surface 72a and the second reflective surface 72b may have a flat shape or a curved shape.

The first light source 70 further includes a molding part 74 to support the reflector 72. Light generated from the light emitting device 71 is reflected by the reflector 72 and provided to the first light guide 141 and the second light guide 143.

The molding part 74 is disposed so as to cover at least the light emitting device 71. The molding part 74 is formed of transparent silicone, epoxy and other resin materials. The molding part 74 has adhesiveness and thus supports the light emitting device 71 and the reflector 72, which are spaced apart from each other.

The second light sources 80 provide light to the third light guides 145. The second light sources 80 are provided in a number corresponding to the number of the third light guides 145. For example, a plurality of second light sources 80 is disposed at one side of the third light guides 145 in the length direction. The second light sources 80 are disposed so as to emit light in the length direction of the third light guides 145. The second light sources 80 are turned on/off by sliding touch sensed by the touch sensor 31.

The light sources may further include subsidiary light sources to reinforce insufficient brightness of the first light guides 141 and the second light guides 143. The subsidiary light sources may include point light sources, such as light emitting diodes or laser diodes. The subsidiary light sources include a first subsidiary light source 91 to reinforce brightness of the second light guide 143, and a second subsidiary light source 95 to reinforce brightness of the first light guide 141.

The first subsidiary light source 91 provides light to the second light guide 143. Although light incident from the first light source 70 is diffused within the second light guide 143, a portion having low brightness is present in the second light guide 143 due to the shape and length of the second light guide 143. The first subsidiary light source 91 is disposed to provide light to the portion of the second light guide 143 having low brightness.

As one example, the first light source 70 may provide light to one end of the second light guide 143 in the length direction, and the first subsidiary light source 91 may provide light to the other end of the second light guide 143 in the length direction. Here, the first light source 70 is disposed so as to provide light in the direction of the first subsidiary light source 91, and the first subsidiary light source 91 is disposed so as to provide light in the direction of the first light source 70. The number of first subsidiary light sources 91 is not limited and may be adjusted according to the size of the second light guide 143.

As another example, a plurality of first subsidiary light sources 91 may be arranged at a designated pitch in the length direction of the second light guide 143.

The second subsidiary light source 95 provides light to the first light guide 141. Although light incident from the first light source 70 is diffused within the first light guide 141, a portion having low brightness is present in the first light guide 141 due to the shape and length of the first light guide 141. The second subsidiary light source 95 is disposed to provide light to the portion of the first light guide 141 having low brightness.

The light sources are located on the circuit board 130. The circuit board 130 provides a space in which the light sources are located, and transmits power and a control signal to the light sources. For example, the circuit board 130 may include a body having an electric pattern (not shown) having electrical conductivity, and an electrically insulative body, surrounding the electric pattern and having an opening part (not shown) to expose one region of the electric pattern. The light sources are conductively connected to the electric pattern. A connector (not shown) conductively connected to an external power source may be provided on the circuit board 130. The connector conductively connects the circuit board 130 to the external power source.

The body of the circuit board 130 may include an insulating material. For example, the body of the circuit board 130 may be formed of FR-4 or include at least one of polyimide, a liquid crystal polymer (LCP), polyester, polyethylene naphthalate (PEN) and polyethylene terephthalate (PET), but the disclosure is not limited thereto. The circuit board 130 may be a general printed circuit board (PCB), a metal core PCB, a flexible PCB or a ceramic PCB.

The circuit board 130 is formed of a transparent or translucent material so as to transmit light emitted from the light guides 140. In detail, the circuit board 130 may have a structure in which electrodes formed of a transparent metal, such as ITO, are disposed on a transparent resin-based body.

In this embodiment, the user interface apparatus 100 further includes a bottom cover 150 to fix the positions of the light guides 140, the light sources and the circuit board 130 and to support the same. A plurality of mount recesses 151, in which the light guides 140, the light sources and the circuit board 130 are mounted, may be formed on the bottom cover 150.

The bottom cover 150 may restrict emission of light from the light sources and the light guides 140. The bottom cover 150 may be formed of an opaque material.

A reflective material to reflect incident light may be applied to the bottom cover 150. In detail, the light guides 140 are disposed on the bottom cover 150 and the reflective material is applied to one surface of the bottom cover 150, on which the light guides 140 are disposed, thereby increasing brightness of light diffused through the light guides 140.

The bottom cover 150 may be disposed under or on the circuit board 130 and the light guides 140. In detail, as exemplarily shown in FIG. 3, the bottom cover 150 is disposed under the light guides 140 and the circuit board 130, and the top cover 110 is disposed on the circuit board 130. That is, the bottom cover 150 and the top cover 110 may define a space formed therein, and the light sources, the light guides 140 and the circuit board 130 may be located in the space.

The bottom cover 150 may be formed by injection molding. In detail, in this embodiment, the top cover 110, the light sources, the touch sensor 31 and the circuit board 130, attached to each other and mounted on each other, are formed together with the bottom cover 150 by insert injection molding.

The bottom cover 150 includes a resin material. For example, the bottom cover 150 may be formed of one or a combination of two, selected from polycarbonate (PC), an acrylonitrile butadiene styrene (ABS) copolymer and a polyamide (PA) resin.

If the bottom cover 150, the light sources, the light guides 140, the circuit board 130, etc. are formed by insert injection molding, a part of the bottom cover 150 flows into a gap between the light sources and the light guides 140 during the injection molding process and thus restricts flow of light from the light sources to the light guides 140. Therefore, an inflow prevention unit 82 to prevent inflow of the bottom cover 150 is disposed in a space between the light sources and the light guides 140. The inflow prevention unit 82 includes a resin which transmits light and has adhesiveness. For example, the inflow prevention unit 82 may include at least one of transparent urethane, acryl and silicone.

The touch sensor 31 senses touch and provides a touch signal to a processor 20, which will be described later. The touch sensor 31 serves as an input device which receives a user command. Of course, as another example, other input devices instead of the touch sensor 31 may be used. However, the disclosure is not limited thereto.

The touch sensor 31 may employ any one of a variable capacitance type, a variable electrical conductivity type (a variable resistance type) and a variable light quantity type. Particularly, the touch sensor 31 may employ a variable resistance type.

The touch sensor 31 is disposed such that at least a part of the touch sensor 31 vertically overlaps the second light guide 143. A user recognizes a touch position, at which a touch command is input, by light emitted from the second light guide 143.

The touch sensor 31 may be formed of a transparent material which does not intercept light emitted from the light guides 140. As one example, the touch sensor 31 may include ITO electrodes formed at some regions of the circuit board 130. As another example, the touch sensor 31 may include thin electrodes having a fine thickness (a nano-size) formed at some regions of the circuit board 130. Light travels along gaps between the thin electrodes.

As another example, the electrodes of the touch sensor 31 may intercept a part of light emitted from the light guides 140 and thus adjust the shape of light emitted toward the top cover 110. That is, the touch sensor 31 serves to intercept a part of light and to pass the other part of the light. Here, a part of a light interception filter 125, which vertically overlaps the second light guide 143, may be omitted.

The top cover 110 forms the external appearance of the user interface apparatus 100. The top cover 110 covers the light sources, the touch sensor 31 and the light guides 140, and transmits light emitted from the light guides 140 to the inside of the vehicle 1 to project an image. The top cover 110 provides a space touched by a user.

The top cover 110 is formed of a material which transmits light emitted from the light guides 140 and has abrasion resistance to user touch and a design matching that of the interior of the vehicle 1. For example, the top cover 110 may have a monolayer or multilayer structure which satisfies abrasion resistance, light transmission and design.

In detail, the top cover 110 may be formed by bonding a plurality of layers. The top cover 110 may include a design layer (not shown) forming the external design of the user interface apparatus 100 and a coating layer (not shown) reinforcing rigidity and abrasion resistance. The design layer is formed of leather, wood, stone, a resin or a metal. The coating layer is coated on the upper surface of the design layer and prevents abrasion or damage to the design layer. The coating layer may be formed of a transparent resin.

In accordance with one embodiment, the entirety of the top cover 110 may be formed of a light transmitting material, and the light interception filter 125 may be disposed under the top cover 125 so as to emit light to some regions of the top cover 110. In accordance with another embodiment, the top cover 110 may be configured such that some regions of the top cover 110 transmit light and other regions of the top cover 110 intercept light and, in this case, the light interception filter 125 may be omitted.

The top cover 110 includes the first region 11 to the third region 13, which transmit light to project an image. The first region 11 to the third region 13 may be defined by the light interception filter 125, if the entirety of the cop cover 110 is transparent. The first region 11 to the third region 13 may be defined as regions of the top cover 110 having a high light transmittance, as compared to other regions of the top cover 110.

The top cover 110 includes a light transmission part 111 and an interception part 112. The light transmission part 111 forms the first region 11 to the third region 13 and has a designated light transmittance. The interception part 112 corresponds to the remaining region of the top cover 110 except for the first region 11 to the third region 13. The interception part 112 intercepts light. The light transmission part 111 has a higher light transmittance than the interception part 112. The light transmission part 111 may be formed of a different material from the interception part 112. Otherwise, the thickness of the light transmission part 111 may be less than the thickness of the interception part 112.

The first region 11 is disposed so as to correspond to the first light guide 141. In detail, the first region 11 is disposed such that at least a part of the first region 11 may vertically overlap the first light guide 141.

The second region 12 is disposed so as to correspond to the second light guide 143. In detail, the second region 12 is disposed such that at least a part of the second region 12 may vertically overlap the second light guide 143.

The third region 13 is disposed so as to correspond to the third light guides 145. In detail, the third region 13 is disposed such that at least a part of the third region 13 may vertically overlap the third light guides 145.

The light interception filter 125 transmits light transferred from the light guides 140 so as to provide the light to the first region 11 to the third region 13 of the top cover 110, and restricts transmission of light from the light guides 140 to other regions of the top cover 110 except for the first region 11 to the third region 13. The light interception filter 125 may define the first region 11 to the third region 13 of the top cover 110 and define images displayed on the first region 11 to the third region 13.

The light interception filter 125 is disposed under the cover 110. The light interception filter 125 is laminated between the top cover 110 and the circuit board 130 using a resin. The light interception filter 125 is formed by applying a material which shields light.

The user interface apparatus 100 in accordance with this embodiment may further include color filters 120, which change wavelengths of light supplied from the light guides 140 and provide light having changed wavelengths to the first region 11 to the third region 13 of the top cover 110. The color filters 120 are disposed so as to correspond to the first region 11 to the third region 13. In detail, the color filters 120 are disposed such that at least parts of the color filters 120 may vertically overlap the first region 11 to the third region 13.

The color filters 120 may include a first color filter 121 which changes a wavelength of light incident from the first light guide 141 and provides light having the changed wavelength to the first region 11, a second color filter 122 which changes a wavelength of light incident from the second light guide 143 and provides light having the changed wavelength to the second region 13, and third color filters 123 which change a wavelength of light incident from the third light guides 143 and provide light having the changed wavelength to the third region 13.

The color filters 120 change wavelengths of light emitted through the top cover 110 and define specific images through light. Various patterns may be printed on the color filters 120. The color filters 120 may be disposed under the top cover 110 and be disposed coplanar with the light interception filter 125.

Hereinafter, the structure of the second light guide 143 will be described in detail.

Figure 6A:
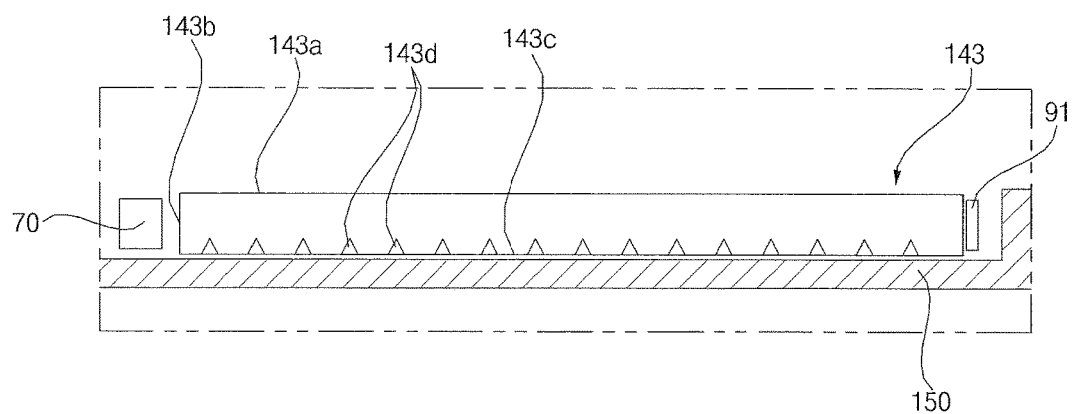
FIGS. 6A to 6C are cross-sectional views exemplarily illustrating second light guides in accordance with various embodiments of the present invention, taken along line B-B of FIG. 4.
Figure 6B:
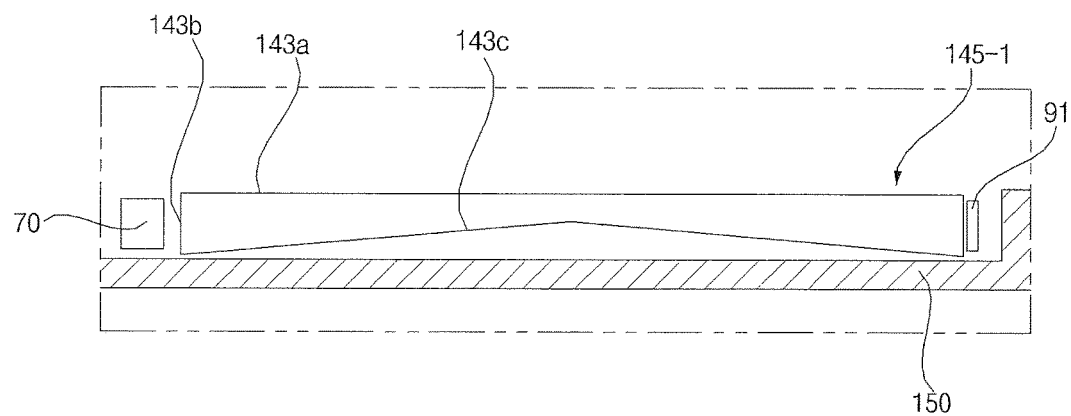
Figure 6C:
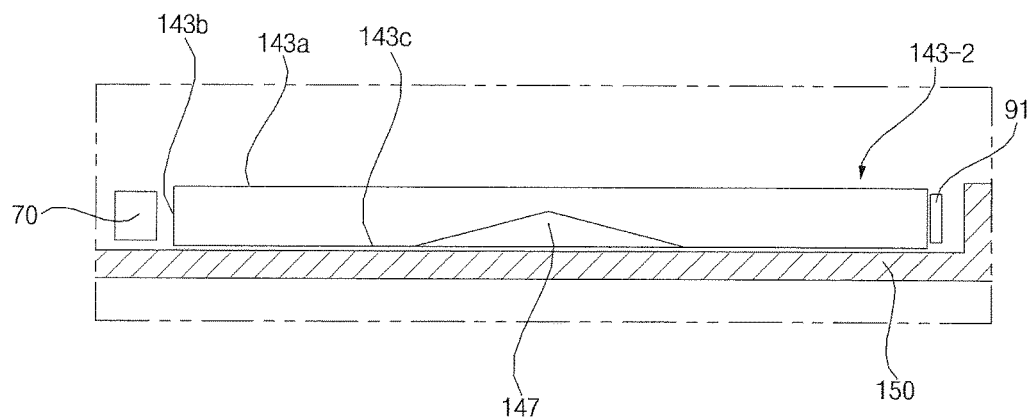

FIGS. 6A to 6C are cross-sectional views exemplarily illustrating second light guides in accordance with various embodiments of the present invention, taken along line B-B of FIG. 4.

FIG. 6A illustrates a second light guide 143 in accordance with one embodiment. With reference to FIG. 6A, the second light guide 143 at least includes an incidence surface 143b, an emission surface 143a and a transfer surface 143c. The light guide 140 may have a platy shape having an emission surface to emit surface light, a transfer surface located opposite the emission surface, and four side surfaces connecting the emission surface and the transfer surface. The light guide 140 may have a structure which is equal or similar to the structure of the second light guide 143, but the disclosure is not limited thereto.

The transfer surface 143c forms the lower surface of the second light guide 143, executes scattered reflection of light incident through the incidence surface 143b from a plurality of light sources, and transfers reflected light. The transfer surface 143c is disposed opposite the emission surface 143c.

For example, the transfer surface 143c may be formed by depositing an aluminum layer having excellent reflectivity on a resin material, or formed by depositing an aluminum layer having excellent reflectivity on a resin material and randomly disposing a plurality of reflective protrusions 143d. The above-described reflective protrusions 143d reflect light incident from the light sources in several directions.

The emission surface 143a forms the upper surface of the second light guide 143 and is spaced apart from the transfer surface 143c in the upward direction. Air may fill a space between the transfer surface 143c and the emission surface 143a. The emission surface 143a and the transfer surface 143c are disposed in parallel so as to effectively propagate light. The emission surface 143a has a greater area than the incidence surface 143b.

In detail, an irregular reflective pattern may be disposed on the emission surface 143a. The emission surface 143a reflects a part of light incident through the incidence surface 143b from the light sources in the downward direction so as to transfer the light in the opposite direction to the incidence surface 143b, and emits the other part of the light incident through the incidence surface 143b from the light sources to the front of the second light guide 143. The emission surface 143a is disposed so as to intersect the incidence surface 143b.

The incidence surface 143b is a space which is disposed between the transfer surface 143c and the emission surface 143a and receives light incident from the light sources.

In order to maintain uniform brightness throughout the emission surface 143a of the second light guide 143, the reflective protrusions 143d may be variously disposed. The reflective protrusions 143d are disposed on the second light guide 143 and execute scattered reflection of light supplied from the first light source 70 and/or the first subsidiary light source 91.

Since an amount of light transferred through the second light guide 143 is decreased as the distance between the second light guide 143 and the first light source 70 increases, the density of the reflective protrusions 143d is increased as the distance between the reflective protrusions 143d and the first light source 70 increases. Here, the density means the sum of the areas of the reflective protrusions 143d per unit area of the second light guide 143, as viewed from the top.

As one example, the sizes of the reflective protrusions 143d are increased as the distance between the reflective protrusions 143d and the first light source 70 increases. As another example, as exemplarily shown in FIG. 6A, the sizes of the reflective protrusions 143d may be equal, but the pitches between the reflective protrusions 143d may be decreased as the distance between the reflective protrusions 143d and the first light source 70 increases. Therefore, brightness of a portion of the second light guide 143 located away from the first light source 70 may be improved.

In accordance with this embodiment, since the first subsidiary light source 91 to reinforce brightness of the second light guide 143 is used and the second light guide 143 is extended in one direction, the density of the reflective protrusions 143d disposed at the midway point between the first light source 70 and the first subsidiary light source 91 may be highest and, as the reflective protrusions 143d approach the first light source 70 and the first subsidiary light source 91, the density of the reflective protrusions 143d may be decreased.

FIG. 6B illustrates a second light guide 143-1 in accordance with another embodiment. The second light guide 143-1 in accordance with this embodiment shown in FIG. 6B has a shape differing from that of the second light guide 143 in accordance with the former embodiment shown in FIG. 6A.

A transfer surface 143c of the second light guide 143-1 in accordance with this embodiment is inclined upwards as the distance between the transfer surface 143c and the first light source 70 increases. Therefore, brightness of an emission surface 143a located away from the first light source 70 may be compensated. The transfer surface 143c of the second light guide 143 approaches the emission surface 143a as the distance between the second light guide 143-1 and the first light source 70 increases.

In more detail, if the first light source 70 and the first subsidiary light source 91 provide light to the second light guide 143, the transfer surface 143c is inclined upwards, as the distance between the transfer surface 143c and the first light source 70 or the first subsidiary light source 91 increases, and forms a peak at the midway point between the first light source and the first subsidiary light source 91. That is, the transfer surface 143c is inclined downwards in directions from the midway point between the first light source 70 and the first subsidiary light source 91 to the first light source 70 and the first subsidiary light source 91. The transfer surface 143c may have a flat shape or a curved shape. Of course, the transfer surface 143c may have a plurality of peaks according to the number of light sources.

Therefore, brightness of the midway point between the first light source 70 and the first subsidiary light source 91 having a small amount of light supplied from the first light source 70 and the first subsidiary light source 91 may be improved.

Here, the reflective protrusions 143d may be disposed at uniform density, or be disposed in the same manner as in the embodiment shown in FIG. 6A.

FIG. 6C illustrates a second light guide 143-2 in accordance with another embodiment. The second light guide 143-2 in accordance with this embodiment shown in FIG. 6C has a shape differing from that of the second light guide 143 in accordance with the former embodiment shown in FIG. 6A.

A transfer surface 143c of the second light guide 143-2 in accordance with this embodiment may be flat and a light guide reflector 147 may be formed on the transfer surface 143c.

The light guide reflector 147 may have a reflective surface inclined upwards as the light guide reflector 147 becomes distance from the first light source 70. Therefore, brightness of an emission surface 143a located away from the first light source 70 may be compensated. In more detail, if the first light source 70 and the first subsidiary light source 91 provides light to the second light guide 143-2, the reflective surface of the light guide reflector 147 is inclined upwards, as the distance between the light guide reflector 147 and the first light source 70 or the first subsidiary light source 91 increases, and forms a peak at the midway point between the first light source 70 and the first subsidiary light source 91. That is, the light guide reflector 147 is disposed at the midway point between the first light source 70 and the first subsidiary light source 91.

Therefore, brightness of the midway point between the first light source 70 and the first subsidiary light source 91 having a small amount of light supplied from the first light source 70 and the first subsidiary light source 91 may be improved.

Here, reflective protrusions 143d may be disposed at uniform density, or be disposed in the same manner as in the embodiment shown in FIG. 6A.

The above-described structures of the second light guides 143, 143-1 and 143-2 may be applied to the third light guides 145 unless stated otherwise. Particularly, a structure to reinforce non-uniform brightness generated by disposition of the third light guides 145 and the second light sources 80 may be the same as the structure of the second light guide 143.

Figure 7A:
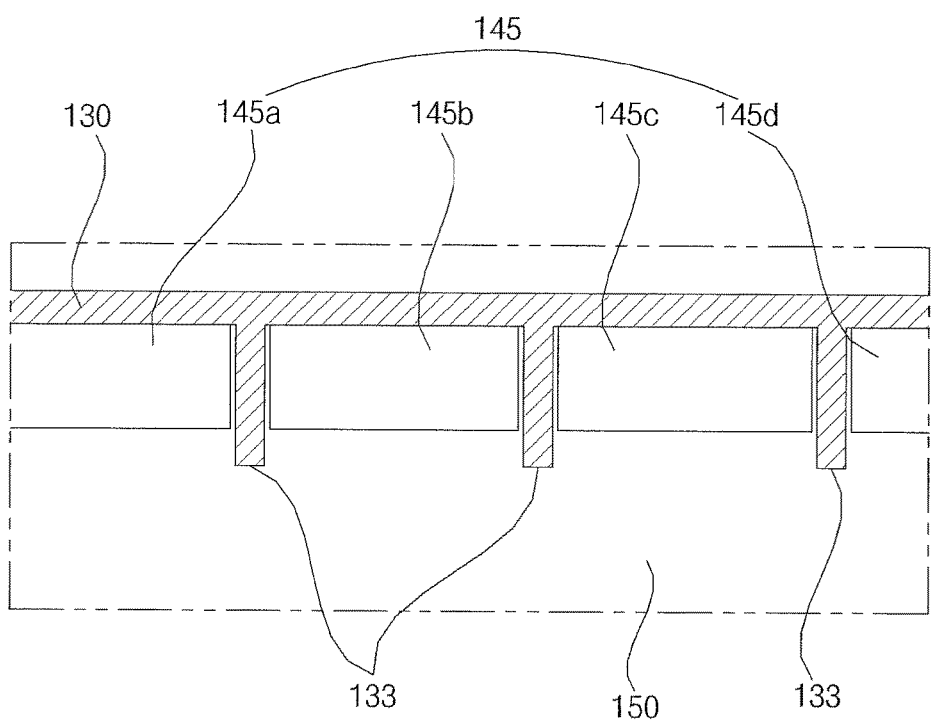
FIGS. 7A and 7B are cross-sectional views taken along line C-C of FIG. 2A.
Figure 7B:
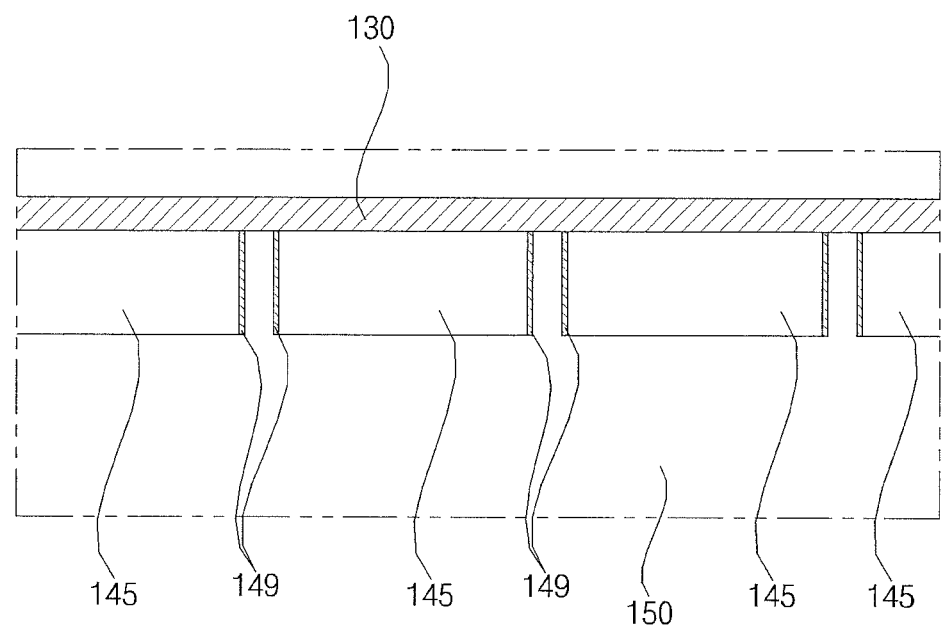

FIGS. 7A and 7B are cross-sectional views taken along line C-C of FIG. 2A.

FIG. 7A illustrates third light guides in accordance with another embodiment. With reference to FIG. 7A, interception ribs 133 to prevent light leakage between a plurality of third light guides 145 are provided.

The interception ribs 133 intercept light between the third light guides 145. In detail, the interception ribs 133 protrude from the circuit board 130. The interception ribs 133 may be formed integrally with the circuit board 130. The interception ribs 133 may include any one of a resin material forming the body of the circuit board 130 and a metal material forming the electrodes of the circuit board 130. The interception ribs 133 may be formed of a reflective material to reflect light or an opaque material.

The interception ribs 133 are disposed between the third light guides 145. In detail, the interception ribs 133 are extended in the length direction (forward and backward directions) of the third light guides 145.

Although the height of the interception ribs 133 may be lower than the height of the third light guides 145, preferably, the height of the interception ribs 133 is higher than or equal to the height of the third light guides 145. Therefore, light leaking through the side surfaces of the third light guides 145 is effectively intercepted by the interception ribs 133.

FIG. 7B illustrates third light guides in accordance with another embodiment. With reference to FIG. 7B, light interception layers 149 to prevent light leakage between a plurality of third light guides 145 are provided.

If a plurality of third light guides 145 is disposed adjacent to each other, optical coherence occurs between the third light guides 145. The light interception layers 149 prevent light leakage between the third light guides 145.

The light interception layers 149 may be formed by coating or printing at least one surface of each of the third light guides 145 with a reflective material or an opaque material. The light interception layers 149 may be formed by attaching a reflective material or an opaque material to at least one surface of each of the third light guides 145.

The light interception layer 149 is disposed on one side surface of each third light guide 145. In detail, when the third light guides 145 are disposed at a designated pitch in the leftward and rightward directions, the light interception layer 149 is disposed on one side surface of each third light guide 145 intersecting the leftward and rightward directions.

Although the height of the light reception layers 149 may be lower than the height of the side surfaces of the third light guides 145, preferably, the height of the light reception layers 149 coincides with the height of the side surfaces of the third light guides 145. Therefore, light leaking through the side surfaces of the third light guides 145 is effectively intercepted by the light interception layers 149.

Figure 8:
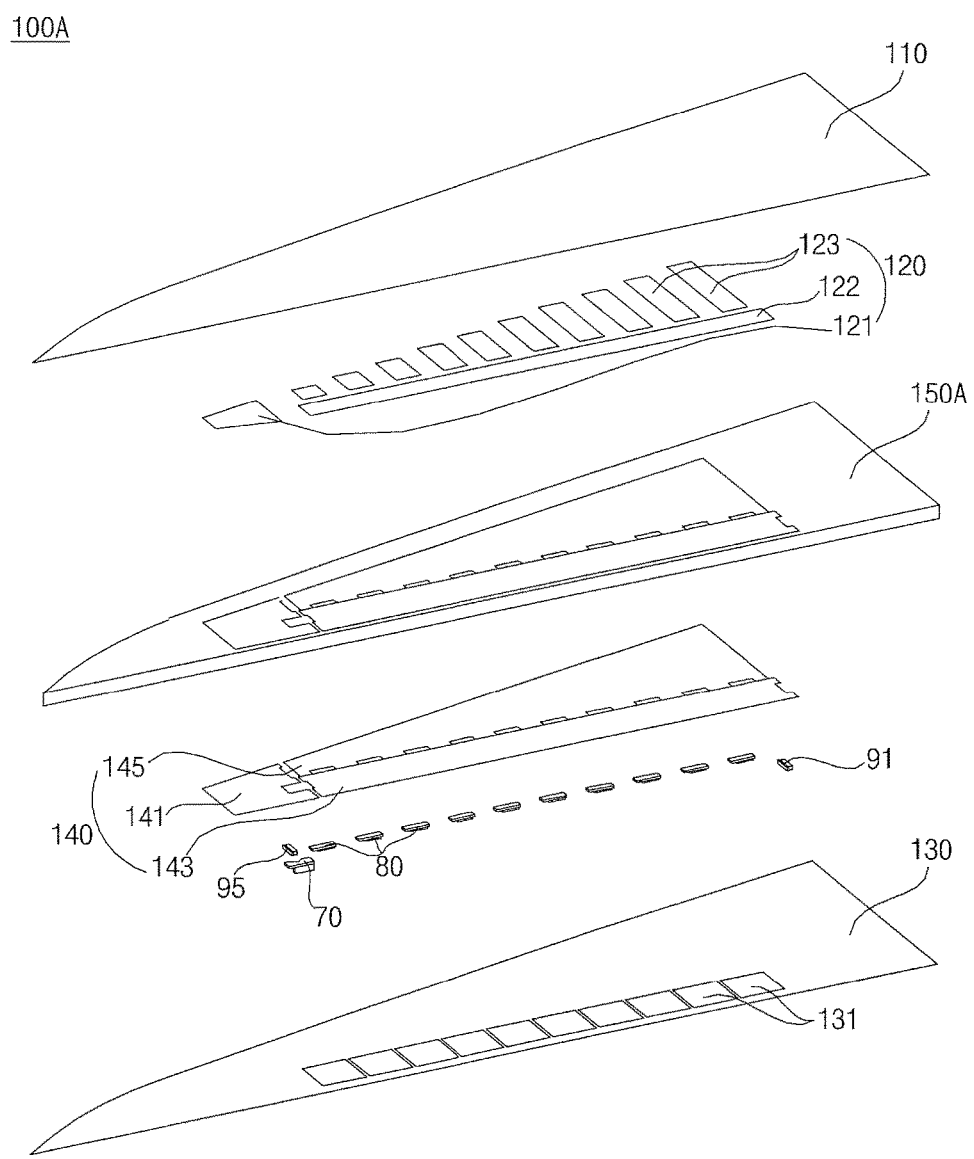
FIG. 8 is an exploded perspective view of a user interface apparatus in accordance with another embodiment of the present invention.
Figure 9:
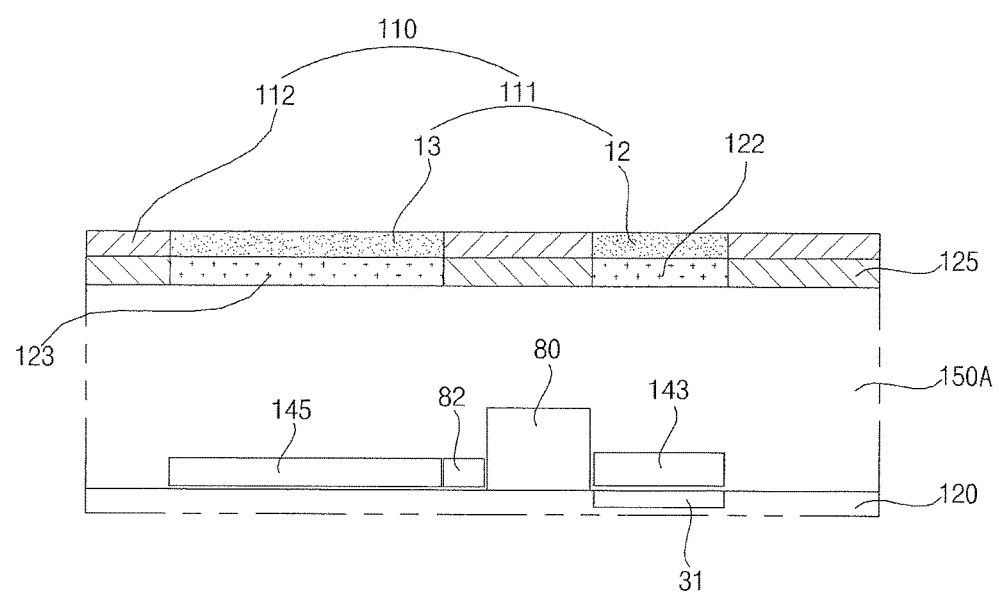
FIG. 9 is a cross-sectional view of the user interface apparatus shown in FIG. 8.

FIG. 8 is an exploded perspective view of a user interface apparatus in accordance with another embodiment of the present invention, and FIG. 9 is a cross-sectional view of the user interface apparatus shown in FIG. 8.

With reference to FIGS. 8 and 9, a user interface apparatus 100A in accordance with this embodiment differs from the user interface apparatus 100 in accordance with the former embodiment shown in FIG. 3 in terms of the positions of a bottom cover 150A, a circuit board 130, light sources and light guides 140.

In the user interface apparatus 100A in accordance with this embodiment, the bottom cover 150A is disposed under a top cover 110, the light sources and the light guides 140 are located under the bottom cover 110, and the circuit board 130 is located under the bottom cover 150A, the light sources and the light guides 140.

In order to emit light generated by the light sources in the upward direction of the top cover 110 through the light guides 140, the bottom cover 150A is formed of a transparent material. Of course, light emitted from the light guides 140 may be emitted in the downward direction through the circuit board 130. Here, the circuit board 130 forms the external appearance of the lower portion of the user interface apparatus 100.

Figure 10:
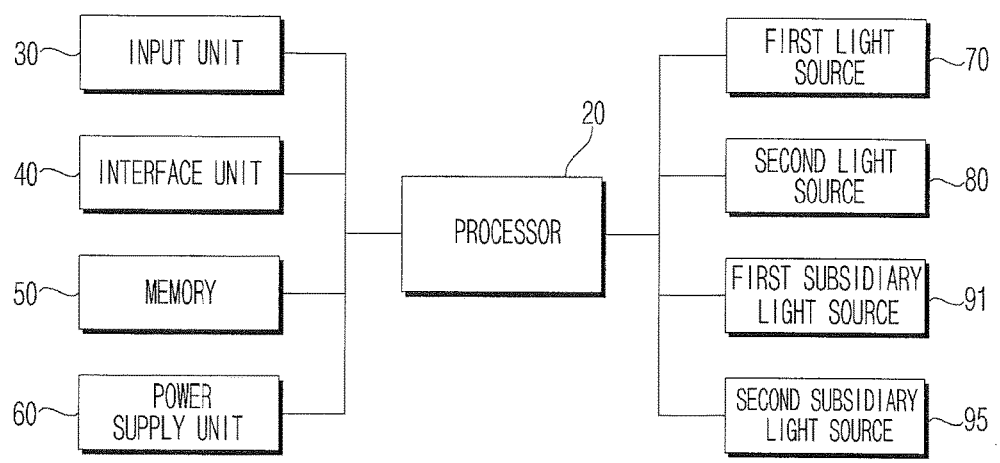
FIG. 10 is a control block diagram of a user interface apparatus in accordance with one embodiment of the present invention.

FIG. 10 is a control block diagram of a user interface apparatus in accordance with one embodiment of the present invention.

The user interface apparatus 100 may further include an input unit 30, an interface unit 40, a memory 50, a processor 20 and a power supply unit 60.

The input unit 30 may receive user input. The input unit 30 may include a mechanical input unit, a touch-type input unit, a voice input unit or a wireless input unit. For example, the input unit may be implemented as a touch sensor 31, as described above.

The touch sensor 31 may receive user input to control the light sources. The touch sensor 31 may receive user input to control a target to be controlled.

The interface unit 40 may receive various signals, information or data, or transmit signals, information or data, which are processed or generated by a processor 20, to the outside. For this purpose, the interface unit 40 may execute data communication with an ECU, a sensing unit, a driving unit of the vehicle 1, etc. through a wired communication method or a wireless communication method.

The interface unit 40 may receive sensor information from the ECU or the sensing unit.

Here, the sensor information may include at least one of direction information of the vehicle 1, position (GPS) information of the vehicle 1, angle information of the vehicle 1, speed information of the vehicle, acceleration information of the vehicle 1, tilt information of the vehicle 1, forward/backward movement information of the vehicle 1, battery information, fuel information, tire information, lamp information of the vehicle 1, inner temperature information of the vehicle 1, inner humidity information of the vehicle 1, and information as to whether or not it is raining.

Such sensor information may be acquired from a heading sensor, a yaw sensor, a gyro sensor, a position module, a vehicle movement sensor, wheel sensors, a vehicle speed sensor, a vehicle frame tilt sensor, a battery sensor, a fuel sensor, tire sensors, a steering sensor to sense a steering angle by rotation of a steering wheel, a temperature sensor to sense the inner temperature of the vehicle 1, a humidity sensor to sense the inner humidity of the vehicle 1, a rain sensor, etc. The position module may include a GPS module to receive GPS information.

Among the sensor information, direction information of the vehicle 1, position information of the vehicle 1, angle information of the vehicle 1, speed information of the vehicle 1 and tilt information of the vehicle 1, which are related to driving of the vehicle 1, may be referred to as driving information of the vehicle 1.

The memory 50 may store programs to process or control the processor 20 and various pieces of data to control the overall operation of the user interface apparatus 100.

The memory 50 may be one of various hardware, i.e., storage devices, including a ROM, a RAM, an EPROM, a flash drive, a hard drive, etc. According to embodiments, the memory 50 may be included as a sub-component of the processor 20.

The processor 20 may control the overall operations of the respective units of the user interface apparatus 100. The processor 20 may be conductively connected to the input unit 30, the interface unit 40, the memory unit 50, the light source and the power supply unit 60.

The processor 20 may receive information of the vehicle 1 through the interface unit 40. In detail, the processor 20 may receive intensity information of air blown by an air conditioner and volume information of an audio system through the interface unit 40.

The processor 20 may control the light sources. The processor 20 may control the light sources according to touch input sensed by the touch sensor 31. Control by the processor 20 will be described in detail with reference to FIG. 11.

The processor 20 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units to execute other functions.

The power supply unit 60 may supply power necessary to operate the respective components under the control of the processor 20. The power supply unit 60 may receive power from a battery, etc. in the vehicle 1.

Figure 11A:
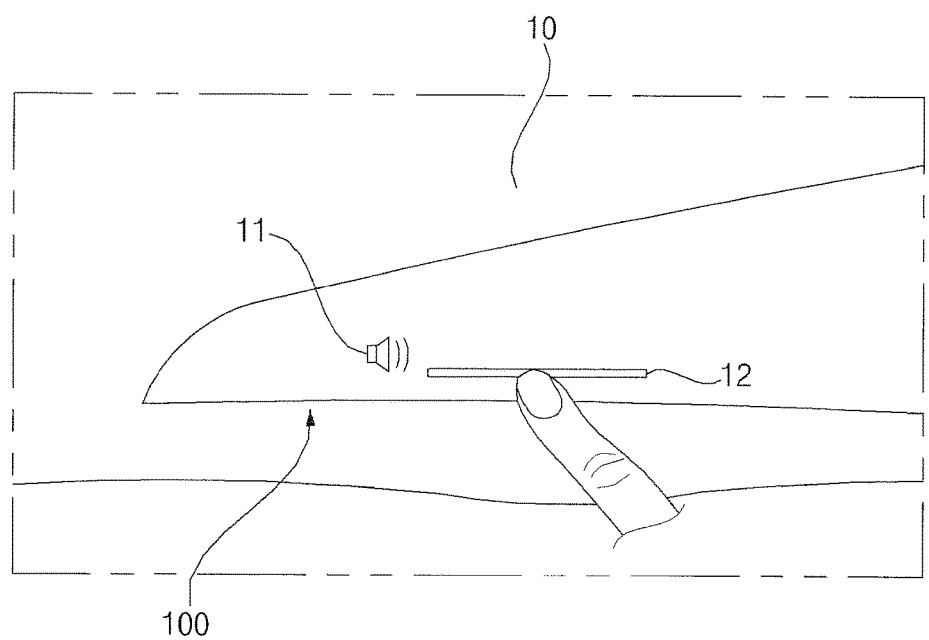
FIGS. 11A and 11B are reference views exemplarily illustrating usage cases of a user interface apparatus in accordance with one embodiment of the present invention.
Figure 11B:
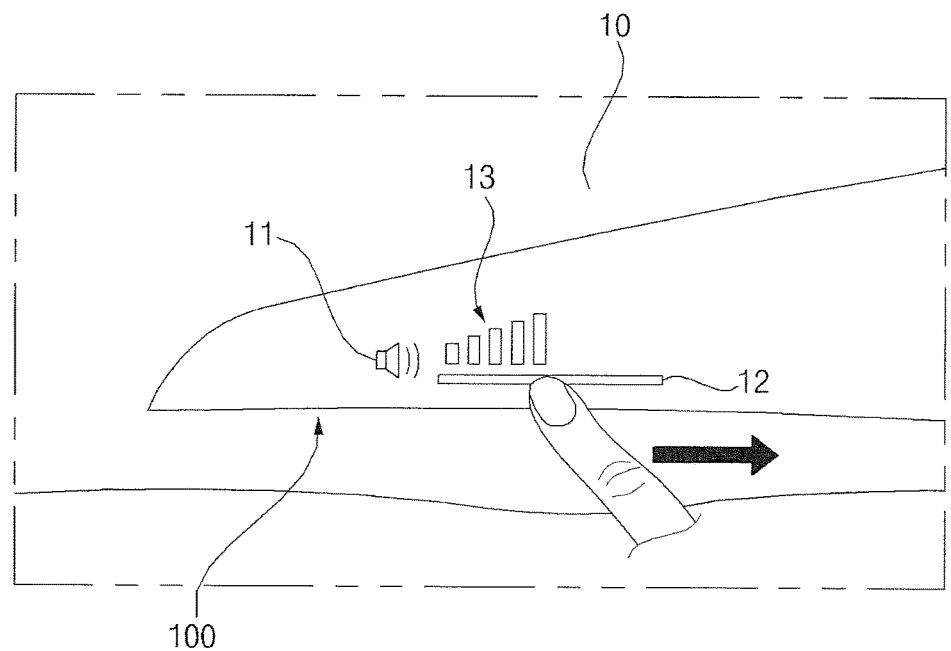

FIGS. 11A and 11B are reference views exemplarily illustrating usage cases of a user interface apparatus in accordance with one embodiment of the present invention.

Initially, the user interface apparatus 100 is concealed in the interior of the vehicle 1.

With reference to FIG. 11A, if the touch sensor 31 senses first touch, the processor 20 controls the first light source 70 so as to generate light corresponding to the first touch. Here, first touch input to the touch sensor 31 under the condition that there is no touch input for a designated time is defined as the first touch. That is, if the first touch is sensed, the processor 20 turns on the first light 70 so that a user recognizes a touch input position and a target device to be controlled through the touch input. Light of the first light source 70 is dispersed and provided to the first light guide 141 and the second light guide 143. In FIG. 11A, in order to cause the user to recognize the target device to be controlled and the functions of the user interface apparatus 100, light is output as a speaker shape to the first region.

As another example, if the touch sensor 31 senses first touch, the processor 20 controls the first light source 70 and the subsidiary light sources so as to generate light corresponding to the first touch. In order to achieve uniform brightness of the first light guide 141 and the second light guide 143, if the first touch is sensed, the processor 20 turns on the first light 70, the first subsidiary light 91 and the second subsidiary light 95.

With reference to FIG. 11B, if the touch sensor 31 senses second touch, the processor 20 controls a plurality of second light sources 80 so as to generate light corresponding to the second touch. Further, if the touch sensor 31 senses second touch, the processor 20 outputs a control signal to control a target device to be controlled so as to correspond to the second touch.

Here, touch input executed within a designated time after the first touch may be defined as the second touch. For example, the second touch may be long touch or sliding touch which is input within a designated time after the first touch.

In detail, the processor 20 turns on the second light sources 80 according to the sliding direction of the second touch, thus causing the user to recognize the state or level of a function. In more detail, the processor 20 may adjust the volume of the audio system according to the sliding direction of the second touch and turn on some of the second light sources 80 or all of the second light sources 80 based on the volume of the audio system.

As apparent from the above description, a user interface apparatus in accordance with one embodiment of the present invention is not exposed to the outside in a deactivated state and, thus, an aesthetic sense provided to a user may be improved.

Further, the user interface apparatus allows a user to recognize a position to input a user command when first touch is input and generates a control signal to control a target device to be controlled when second touch is input and, thus the user may easily input a user command without error.

The user interface apparatus may provide a sense of unity between the external appearance of a top cover and the interior of a vehicle.

The user interface apparatus may be easily and rapidly manufactured through insert injection molding so as to fit an interior design of a vehicle.

The user interface apparatus reduces the number of light sources and may thus achieve a slim design.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A user interface apparatus for vehicles comprising:
   light sources;
   a touch sensor configured to sense touch;
   light guides configured to transfer light generated by the light sources; and
   a top cover configured to cover the light sources, the touch sensor and the light guides and to transmit light emitted from the light guides to the interior of a vehicle so as to project an image, wherein:
   the light sources include a first light source and at least one second light sources;
   the light guides include:
      a first light guide configured to receive light generated by the first light source and to transfer the light to a first region of the top cover, the first region being configured to indicate functions of the user interface apparatus to a user based on receiving the light from the first light guide;
      a second light guide configured to receive light generated by the first light source and to transfer the light to a second region of the top cover, the second region being configured to indicate a position of the touch sensor to the user based on receiving the light from the second light guide; and
      at least one third light guide configured to receive light generated by the at least one second light source and to transfer the light to a third region of the top cover, the third region being configured to indicate states of the functions of the user interface apparatus to the user based on receiving the light from the at least one third light guide; and
   light generated by the first light source is dispersed and provided to the first light guide and the second light guide,
   wherein the touch sensor includes an input area configured to receive one or more touch inputs from the user,
   wherein the first light guide source is configured to generate light in response to the touch sensor detecting a first touch input on the input area based on lack of detection of a prior touch input for a designated time, and
   wherein the at least one second light source is configured to generate light in response to the touch sensor detecting a second touch input on the input area within the designated time after detection of the first touch input.

2. The user interface apparatus for vehicles according to claim 1, wherein:
   the top cover includes a light transmission part corresponding to the first to third regions and having a designated light transmittance, and an interception part to block light; and
   the thickness of the light transmission part is less than the thickness of the interception part.

3. The user interface apparatus for vehicles according to claim 2, further comprising color filters configured to change wavelengths of light supplied from the light guides and then to provide the light having changed wavelengths to the first to third regions of the top cover.

4. The user interface apparatus for vehicles according to claim 1, further comprising a light interception filter configured to transmit light from the light guides and then to provide the light to the first to third regions of the top cover, and to restrict transmission of light from the light guides to other regions of the top cover except for the first to third regions.

5. The user interface apparatus for vehicles according to claim 1, wherein the touch sensor is disposed such that at least a part of the touch sensor may vertically overlap the second light guide.

6. The user interface apparatus for vehicles according to claim 1, wherein the first to third light guides are separated from one another.

7. The user interface apparatus for vehicles according to claim 1, wherein the first to third light guides are formed integrally; and
   the first to third light guides further includes partitions to define boundaries between the first to third light guides and to block light.

8. The user interface apparatus for vehicles according to claim 1, further comprising a light path conversion unit configured to disperse light incident from the first light source so as to provide the light to the first light guide and the second light guide.

9. The user interface apparatus for vehicles according to claim 8, wherein the light path conversion unit includes a reflector including:
   a first reflective surface configured to receive light provided from the first light source and to reflect the light toward the first light guide; and
   a second reflective surface disposed at a designated angle from the first reflective surface and configured to receive light incident from the first light source and to reflect the light toward the second light guide.

10. The user interface apparatus for vehicles according to claim 9, wherein the length of the second light guide is greater than the length of the first light guide.

11. The user interface apparatus for vehicles according to claim 10, wherein the quantity of light incident upon the second reflective surface from the first light source is greater than the quantity of light incident upon the first reflective surface from the first light source.

12. The user interface apparatus for vehicles according to claim 1, further comprising a first subsidiary light source configured to provide light to the second light guide.

13. The user interface apparatus for vehicles according to claim 12, wherein the first light source is disposed adjacent to one end of the second light guide in the length direction, and the first subsidiary light source is disposed adjacent to the other end of the second light guide in the length direction.

14. The user interface apparatus for vehicles according to claim 1, wherein:
the second light guide includes reflective protrusions to reflect light provided from the first light source; and
pitches between the reflective protrusions are decreased as the distance between the reflective protrusions and the first light source increases.

15. The user interface apparatus for vehicles according to claim 1, wherein the second light guide includes:
an incidence surface configured to receive light incident from the first light source;
an emission surface disposed so as to intersect the incidence surface, having a greater area than that of the incidence surface, and configured to emit light incident through the incidence surface; and
a transfer surface disposed opposite the emission surface and configured to reflect light incident through the incidence surface so as to transfer the light,
wherein the transfer surface approaches the emission surface as the distance between the transfer surface and the first light source increases.

16. The user interface apparatus for vehicles according to claim 1, wherein:
a plurality of second light sources is disposed; and
third light guides are provided in a number corresponding to the number of the second light sources,
the user interface apparatus for vehicles further comprising interception ribs disposed between the third light guides so as to intercept light.

17. The user interface apparatus for vehicles according to claim 16, further comprising a circuit board having light transmittance and configured to provide a space to locate the light sources and the touch sensor therein,
wherein the interception ribs protrude from the circuit board.

18. The user interface apparatus for vehicles according to claim 1, further comprising a circuit board having light transmittance and configured to provide a space to locate the light sources and the touch sensor therein.

19. The user interface apparatus for vehicles according to claim 1, further comprising a processor configured to control the light sources according to touch input sensed by the touch sensor.

20. The user interface apparatus for vehicles according to claim 1, wherein the top cover is made of a same material as at least one of a surface of a dashboard of the vehicle, an inner surface of a door of the vehicle, or a surface of a steering device of the vehicle, and
wherein the top cover includes:
a design layer made of at least one of leather, wood, stone, resin, or metal, and
a coating layer configured to protect the design layer.

21. A user interface apparatus for vehicles comprising:
light sources;
a touch sensor configured to sense touch;
light guides configured to transfer light generated by the light sources; and
a top cover configured to cover the light sources, the touch sensor and the light guides and to transmit light emitted from the light guides to the interior of a vehicle so as to project an image, wherein:
the light sources include a first light source and at least one second light sources;
the light guides include:
a first light guide configured to receive light generated by the first light source and to transfer the light to a first region of the top cover, the first region being configured to indicate functions of the user interface apparatus to a user based on receiving the light from the first light guide;
a second light guide configured to receive light generated by the first light source and to transfer the light to a second region of the top cover, the second region being configured to indicate a position of the touch sensor to the user based on receiving the light from the second light guide;
at least one third light guide configured to receive light generated by the at least one second light source and to transfer the light to a third region of the top cover, the third region being configured to indicate states of the functions of the user interface apparatus to the user based on receiving the light from the at least one third light guide; and
the first to third light guides are formed integrally,
wherein the light guides further includes:
partitions configured to define the boundaries between the first to third light guides and to intercept light; and
a light path conversion unit configured to disperse light incident from the first light source so as to provide the light to the first light guide and the second light guide,
wherein the touch sensor includes an input area configured to receive one or more touch inputs from the user,
wherein the first light guide source is configured to generate light in response to the touch sensor detecting a first touch input on the input area based on lack of detection of a prior touch input for a designated time, and
wherein the at least one second light source is configured to generate light in response to the touch sensor detecting a second touch input on the input area within the designated time after detection of the first touch input.

* * * * *